Patented July 23, 1929.  1,721,680

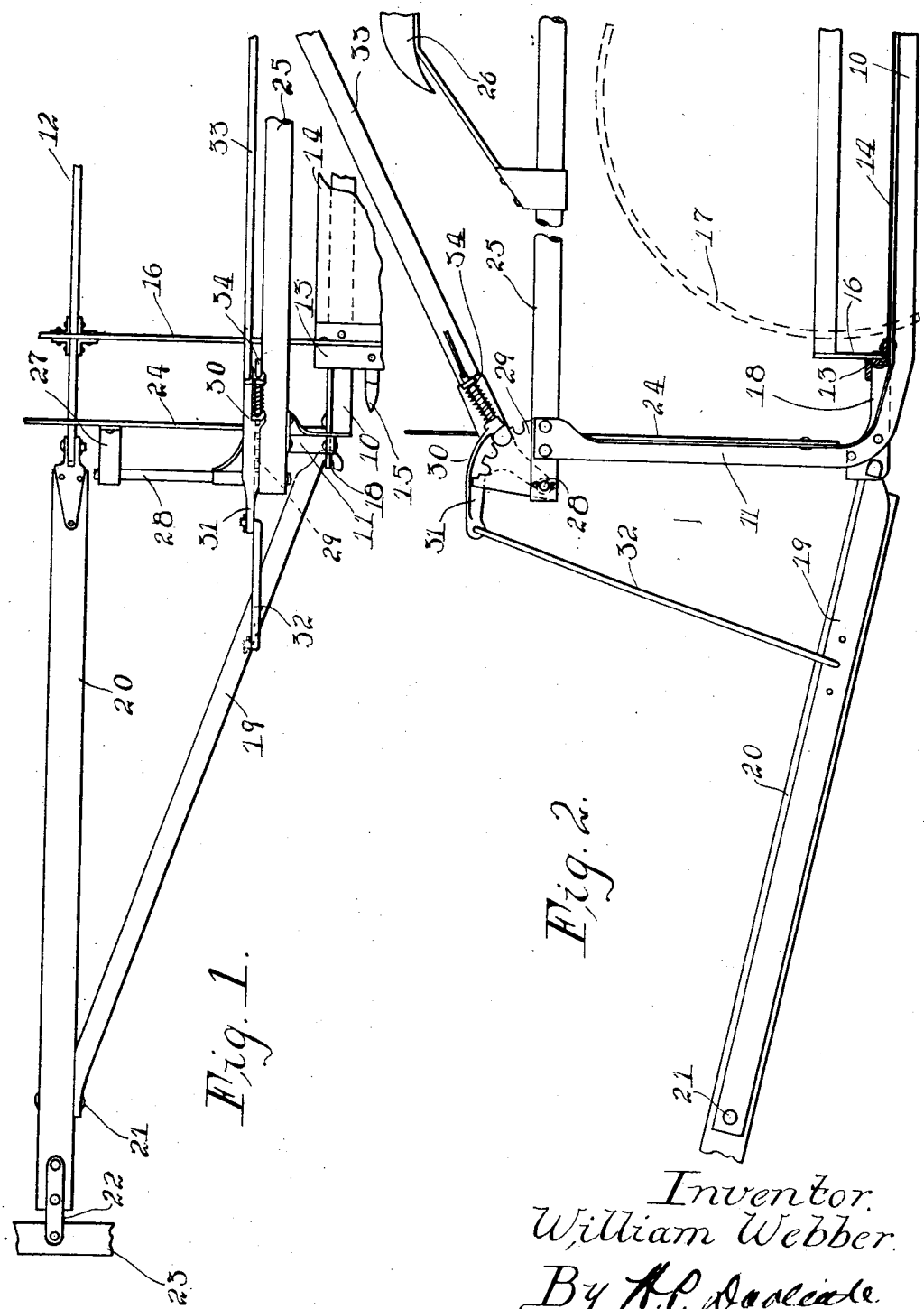

UNITED STATES PATENT OFFICE.

WILLIAM WEBBER, OF LA GRANGE, ILLINOIS, ASSIGNOR TO INTERNATIONAL HARVESTER COMPANY, A CORPORATION OF NEW JERSEY.

TILTING DEVICE FOR HARVESTER PLATFORMS.

Application filed June 14, 1926. Serial No. 115,732.

This invention has reference to harvesting machinery and particularly to an improved construction and arrangement of the lever tilting mechanism for the main frame and cutting mechanism of grain binders.

It is well known that in machines of this type it is a common practice to provide means for permitting a dropping or raising of the harvester frame to adjust the same, and particularly the cutting mechanism thereof, with respect to the length of the grain which is being encountered in the harvesting operation.

It is the main object of this invention to provide an improved mechanism for performing this tilting operation or function of the harvester, and it s a particular object to simplify this type of construction over previously known structures for effecting the same function.

A further object is so to arrange this mechanism that it will perform in the most efficient manner.

In prior constructions now commonly in use, the draft member, or tongue, of the grain binder was pivoted to the main frame thereof while the lever mechanism, which was connected to this draft member for effecting the tilting operation stated, was offset laterally with respect to the hand lever which accomplished this function and, as a result, a very severe twisting and torsional strain on the frame occurred.

Thus, another object of this invention is so to arrange the lever mechanism with respect to the harvester frame and draft member as to overcome entirely this objectional twisting action.

Other equally advantageous objects should, of course, appear to those skilled in this art as the description hereof progresses.

Briefly, these very desirable objects are accomplished in the provision of a grain binder, or harvester, having a main frame which comprises two spaced, longitudinal frame members, one of these frame members being bent vertically up at its front end to carry a supplementary, longitudinal seat supporting pipe, or frame member, upon which in turn is carried a hand lever mechanism. The upwardly bent longitudinal frame member has connected thereto at its bend a forwardly and diagonally extending draft member which is connected to a longitudinally extending draft member which has its rear end pivotally connected to the other longitudinal frame member of the harvester main frame. The hand lever mechanism is additionally provided with a forwardly extending arm which is pivotally connected by a link to the diagonal draft member, the link being in line with the seat supporting pipe. Obviously then, when the hand lever is manipulated, any forces or strains developed incident to such operation are taken up by the seat supporting pipe, which is directly in line with the pivot point of the diagonal draft member to the main frame, thereby overcoming the objectionable torsional twisting strains which were encountered in the use of previous constructions.

Reference is now to be made to the accompanying sheet of drawings which shows an illustrative embodiment of this improvement, and therein it will be seen that,—

Fig. 1 is a fragmentary plan view of a harvester main frame and draft rigging structure in association with the improved tilting mechanism of this invention; and Fig. 2 is a side elevational view of the structure shown in Fig. 1.

The harvester shown embodies a main frame comprising a longitudinal frame member 10 preferably made of angle iron, the forward end of this frame bar being vertically bent upwardly, as at 11. Spaced in parallelism from this frame bar 10 is a second longitudinal frame bar 12. The usual Z-bar 13 is provided and laterally disposed on the frame 10 for supporting the cutting platform 14, which has the usual cutter bar fingers 15 disposed along its front edge. This frame structure is connected by a cross bar 16, as shown in Fig. 1. As is conventional in these machines, it is to be understood that all of this frame structure is supported on a wheel 17, which is indicated in dotted lines in Fig. 2.

A forwardly extending plate 18 is made fast to the Z-bar 13 and the frame bar 10 and is provided at its free end disposed forwardly of the bend in the bar 10 with an aperture into which is hooked a forwardly and diagonally extending draft member 19. Similarly the forward end of the longitudinally disposed frame bar 12 has pivotally connected thereto a longitudinally and forwardly extending draft member 20, the pivots of the two draft members being in lateral alignment. It is further to be noted that the draft member 19 is made fast to the draft member 20 by a bolt 21 and that the draft member 20 carries at its forward end a coupling 22 for attachment to the draw bar 23 of a tractor or other pulling implement.

A shield 24 is made fast to the vertical extension 11 and extends laterally and vertically along the front side of the harvester to provide a shield for the usual elevating mechanism, not shown. The vertical extension 11 carries at its top end a longitudinally extending frame member 25 in the form of a pipe which carries at its rear end in a conventional manner the operator's seat 26.

A bracket 27 extends forwardly from and is bolted to the shield 24, as shown in Fig. 1, and rockably carries therein a transverse shaft 28, the other, or grainward, end of the shaft being similarly rockably fitted into the forward end of the seat pipe 25. A notched sector plate 29 is bolted to the frame pieces 11 and 25, and the shaft 28 carries adjacent this sector plate a lever arm 30 provided with a forward extension 31, which is connected pivotally by a link 32 to the diagonally disposed draft member 19, as shown. The member 30 is provided with a hand lever 33 for rocking the same on the shaft 28 to tilt the main frame of the harvester on the harvester axle, not shown, by permitting the weight of the machine to break its pivot points with the draft members 19 and 20 upon release of the lever 33. For locking the harvester frame and cutting platform in adjusted position, the usual detent mechanism 34 is provided for the lever 33, which cooperates with the notched sector plate 29, as will be understood.

From this construction it will be seen that the pipe 25, upon which is carried the lever mechanism described, will take all of the forces and strains of the leverage directly, because of the connections 31 and 32 to the draft member 19, which are in alignment with the pipe 25. This arrangement of the lever and connecting means in line with the seat pipe, as described, is such that it reduces the effort on the part of the operator to effect the tilting adjustment of the harvester main frame because only a direct pull, or force, is necessary, such force being directly transmitted to the draft members in line with the pull of the operator. It will easily be seen that, because of the alignment of these parts, no torsional or twisting strains are created, and, as a result, this adjusting operation can be much more efficiently accomplished.

Where draft animals are used to pull the harvester instead of a tractor, it will be understood that a tongue truck will be used to support the draft members but this in no way would interfere with the use of the improved tilting mechanism of this disclosure.

From the above disclosure, which illustrates but one form which this invention may assume in practice, it can readily be seen that the same is susceptible of changes in structure and that it is the intention to cover all such changes which fall within the spirit and scope of this invention, as indicated in the following claims.

What I claim is:

1. In a harvester, the combination of a main frame, a cutting platform on said frame, a longitudinally disposed seat supporting member on said frame, a lever mounted on the seat supporting member, a draft member pivoted to the main frame beneath the seat supporting member, and a connection from the lever to the draft member in line with the seat supporting member for adjusting the frame and cutting platform.

2. In a harvester, the combination of a frame, a cutting platform on said frame, a draft member pivoted to the frame, a lever and detent device carried on the frame directly above the pivoted connection of the draft member to the frame, an arm movable with the lever, and a link connecting the arm and draft member whereby the lever will serve to tilt the main frame and cutting platform.

3. In a harvester, the combination of a main frame, a cutting platform supported thereon, a draft member pivotally connected to the frame, a longitudinal frame member above the main frame, a transverse shaft carried by the main frame and longitudinal frame member, a lever including a forwardly extending arm mounted on said shaft, and a connection from the free end of said arm to the draft member in line with the longitudinal frame member, whereby the lever will serve to tilt the main frame and cutting platform.

4. In a harvester, the combination of a main frame embodying a longitudinally disposed frame member bent up at its forward end to provide a support for an upper longitudinal frame member, a draft member pivotally connected to the first frame member at its bend, a lever carried on the second frame member, and a connection from the lever to the draft member, whereby the lever will serve to tilt the harvester frame.

5. In a harvester having a main frame, including a seat supporting pipe, a draft member pivotally connected to the frame in line with said seat pipe, and a lever on the seat pipe having a connection with the draft member in line with the seat pipe.

6. In a harvester, the combination of a main frame embodying a pair of spaced longitudinal frame members, forwardly converging draft members pivotally connected to the frame in line with the longitudinal frame members, a seat supporting frame member above the main frame, a lever supported thereon, and a connection from the lever in line with the seat supporting frame member and connected to one of said draft members, whereby the lever will serve to tilt the harvester frame.

7. In a harvester, the combination of a main frame, a longitudinally disposed draft member pivotally connected thereto, a diagonally disposed draft member connected to the first draft member and pivotally connected to the main frame, a supplementary frame longitudinally disposed above the main frame and in line with the pivoted connection of the diagonal draft member, a lever mounted on the supplementary frame member, and a connection from the lever to the diagonal draft member for tilting the harvester frame on the pivots of the draft members.

In testimony whereof I affix my signature.

WILLIAM WEBBER.